United States Patent
Beesley

(10) Patent No.: US 9,884,724 B1
(45) Date of Patent: Feb. 6, 2018

(54) CONVEYOR BELT AND PLATFORM FOR CONVEYOR BELT

(71) Applicant: ILLINOIS TOOL WORKS INC., Glenview, IL (US)

(72) Inventor: Robert C. Beesley, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/786,690

(22) Filed: Oct. 18, 2017

Related U.S. Application Data

(66) Continuation of application No. 14/250,703, filed on Apr. 11, 2014, Substitute for application No. 61/812,421, filed on Apr. 16, 2013.

(51) Int. Cl.
*B65G 17/46* (2006.01)
*B65G 17/06* (2006.01)
*B65G 17/44* (2006.01)

(52) U.S. Cl.
CPC .......... *B65G 17/46* (2013.01); *B65G 17/066* (2013.01); *B65G 17/44* (2013.01)

(58) Field of Classification Search
CPC ....... B65G 17/46; B65G 17/44; B65G 17/066
USPC .......... 198/699.1, 844.1, 849, 850, 851, 852
See application file for complete search history.

(56) References Cited

U.S. PATENT DOCUMENTS

| | | | | |
|---|---|---|---|---|
| 5,042,648 A * | 8/1991 | Garvey | ................ | B65G 17/066 198/321 |
| 5,404,997 A | 4/1995 | Schreier et al. | | |
| 6,173,832 B1 * | 1/2001 | Cockayne | ............ | B65G 17/086 198/852 |
| 6,209,716 B1 | 4/2001 | Bogle | | |
| 6,247,583 B1 * | 6/2001 | Coen | ..................... | B65G 17/065 198/852 |
| 6,347,699 B1 * | 2/2002 | Ramsey | ............... | B65G 17/086 198/844.1 |
| 6,601,697 B2 | 8/2003 | Steeber | | |
| 6,736,259 B1 * | 5/2004 | Funabashi | ............ | B65G 17/086 198/852 |
| 6,758,328 B2 * | 7/2004 | Arai | ..................... | B65G 17/086 198/844.1 |

(Continued)

FOREIGN PATENT DOCUMENTS

WO 2014/018544 A1 1/2014

OTHER PUBLICATIONS

International Search Report for Application No. PCT/US2014/034117 dated Aug. 4, 2014.

*Primary Examiner* — Douglas A Hess
(74) *Attorney, Agent, or Firm* — JK Intellectual Property Law, PA

(57) ABSTRACT

A surface platform for a conveyor belt includes a platform member having an upper surface and a rail member at one side of the upper surface. The upper surface has a first portion adjacent the rail member, a second portion adjacent the first portion, and a third portion adjacent the second portion. The second portion extends upward at a distance and in a direction such that when an article is placed on the platform member in contact with the rail the article extends to, and no further than, the second portion. The first portion may extend at least to a center of the platform member and may be horizontal. The second portion may extend upwardly less than a height of the rail member.

10 Claims, 12 Drawing Sheets

(56) References Cited

U.S. PATENT DOCUMENTS

| | | | |
|---|---|---|---|
| 6,761,264 B2 | 7/2004 | Steeber et al. | |
| 6,814,224 B2 | 11/2004 | Garbagnati | |
| 6,981,584 B2 * | 1/2006 | Grabmann | B65G 17/065 |
| | | | 198/850 |
| 7,032,810 B2 | 4/2006 | Benedetti et al. | |
| 7,207,434 B2 | 4/2007 | Hartness et al. | |
| 7,278,531 B2 | 10/2007 | Hartness et al. | |
| 7,731,021 B2 | 6/2010 | Melançon et al. | |
| 7,896,766 B2 | 3/2011 | Mitzschke | |
| 8,016,103 B2 | 9/2011 | Krischer | |
| 8,162,129 B2 | 4/2012 | Franz | |
| 8,505,715 B2 | 8/2013 | Andreoli et al. | |
| 9,156,620 B2 | 10/2015 | Whitten et al. | |
| 9,527,671 B2 * | 12/2016 | Marshall | B65G 17/086 |
| 2009/0200136 A1 | 8/2009 | Giehrl et al. | |

\* cited by examiner

CONVEYOR BELT AND PLATFORM FOR CONVEYOR BELT

RELATED APPLICATIONS

This application claims filing benefit of U.S. Provisional Patent Application Ser. No. 61/812,421, having a filing date of Apr. 16, 2013, and U.S. patent application Ser. No. 14/250,703, having a filing date of Apr. 11, 2014, both of which are incorporated herein by reference in their entirety.

TECHNICAL FIELD

The present disclosure relates generally to the field of conveyor belts. More particularly, the disclosure relates to conveyor belts with removable tops.

BACKGROUND

Conveying systems are well known in the art and have any number of useful applications, such as the transportation of objects in various stages of manufacturing, storage, and shipping. Typical conveying systems utilize a flat conveying belt, generally formed of interconnected links, driven by motors that engage with the conveyor belt. Sometimes belts made of such links are also called chains. Such conveying systems are commonly employed in the transportation of manufactured goods and articles. With these typical systems, the motor drives a toothed drive sprocket that engages with complimenting driving recesses or "dogs" formed on the conveyor belt.

Link type conveyor belts are sometimes designed in a knuckle/socket joint arrangement wherein one end of the link is a rounded knuckle and the opposite end is a socket formed by two extending edges. The knuckle of one link fits into the socket of a neighboring link. The knuckle is able to move in various directions within the socket, which allows for the conveyor system as a whole to curve and move.

The interconnected links typically have a platform member connected to or formed at the link's upper surface. The platform member is generally shaped to match the neighboring platform members on other links such that the links can turn while moving around curved sections of the conveying system, yet are also shaped such that the cracks and spaces formed between the links are minimized. The platform members can be connected to the links in several different ways. For instance, the platforms may have pegs extending therefrom which match corresponding slots on the links. Alternatively or additionally, the platforms can have snap springs which lock into place on corresponding sections of the links. Such a knuckle link with a snap-on platform surface member is disclosed in U.S. Pat. No. 6,209,716.

The platform surface member on the conveyor links of that patent has a substantially flat upper surface with no substantially vertical end walls. Such structure works well for most conveyances. U.S. Pat. No. 6,601,697 discloses an alternate platform with vertical walls in the form of a rail member. Such end walls can be useful in preventing articles from shifting laterally, especially due to tangential or centrifugal forces when going around bends and/or travelling non-horizontally.

Some conventional "drink boxes" are made of sheets of material that are folded and welded or glued together to form a box shape. U.S. Pat. No. 7,032,810, entitled "Sealed Package for Pourable Food Products," shows such a drink box in FIG. 4. Such drink boxes have been successfully introduced and are in great use in many countries worldwide. The description of such drink box ("package 15") of that patent is incorporated herein. As shown therein, the bottom of the box includes a widthwise seal and triangular side edges folded inward. The boxes are often slightly concave on the bottom side, with the four corners of the bottom comprising points that extend the furthest downward. It can be sometimes more difficult to handle and convey such slightly irregular drink boxes than it would be, for example, to handle and convey a flat bottomed box with no seals, edges, or concavities on the bottom side. Such difficulties can manifest themselves in particular when conveying at high speeds and/or around bends.

SUMMARY

According to certain aspects of the disclosure, a conveyor belt for conveying articles having a width includes an interconnected series of relatively pivotable body members and a plurality of platform members. Each platform member is attached to a respective one of the body members, each platform member having an upper surface and a substantially vertical rail member extending upward at one side of the upper surface. The upper surface has a first portion adjacent the rail member, a second portion adjacent the first portion, and a third portion adjacent the second portion. The first portion extends substantially horizontally from the rail member toward the second portion at least to a center of the platform member, and the second portion extends upward in a direction from the first portion toward the third portion. The first and second portions are configured relative to the width of the article such that when placed on the platform member in contact with the rail the article extends to and no further than the second portion. The second portion extends upwardly less than a height of the rail member relative to the first portion. Various options and modifications are possible.

According to certain other aspects of the disclosure, a surface platform member for a conveyor belt may include an upper surface and a substantially vertical rail member extending upward at one side of the upper surface. The upper surface has a first portion adjacent the rail member, a second portion adjacent the first portion, and a third portion adjacent the second portion. The first portion extends from the rail member substantially horizontally toward the second portion at least to a center of the platform member, and the second portion extends upward in a direction from the first portion toward the third portion. The first and second portions are configured relative to the width of the article such that when placed on the platform member in contact with the rail the article extends to and no further than the second portion. The second portion extends upwardly less than a height of the rail member relative to the first portion. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention

BRIEF DESCRIPTION OF THE DRAWINGS

A full and enabling disclosure of the present invention is set forth in the specification, which makes reference to the appended figures, in which.

DETAILED DESCRIPTION

Figure 1:
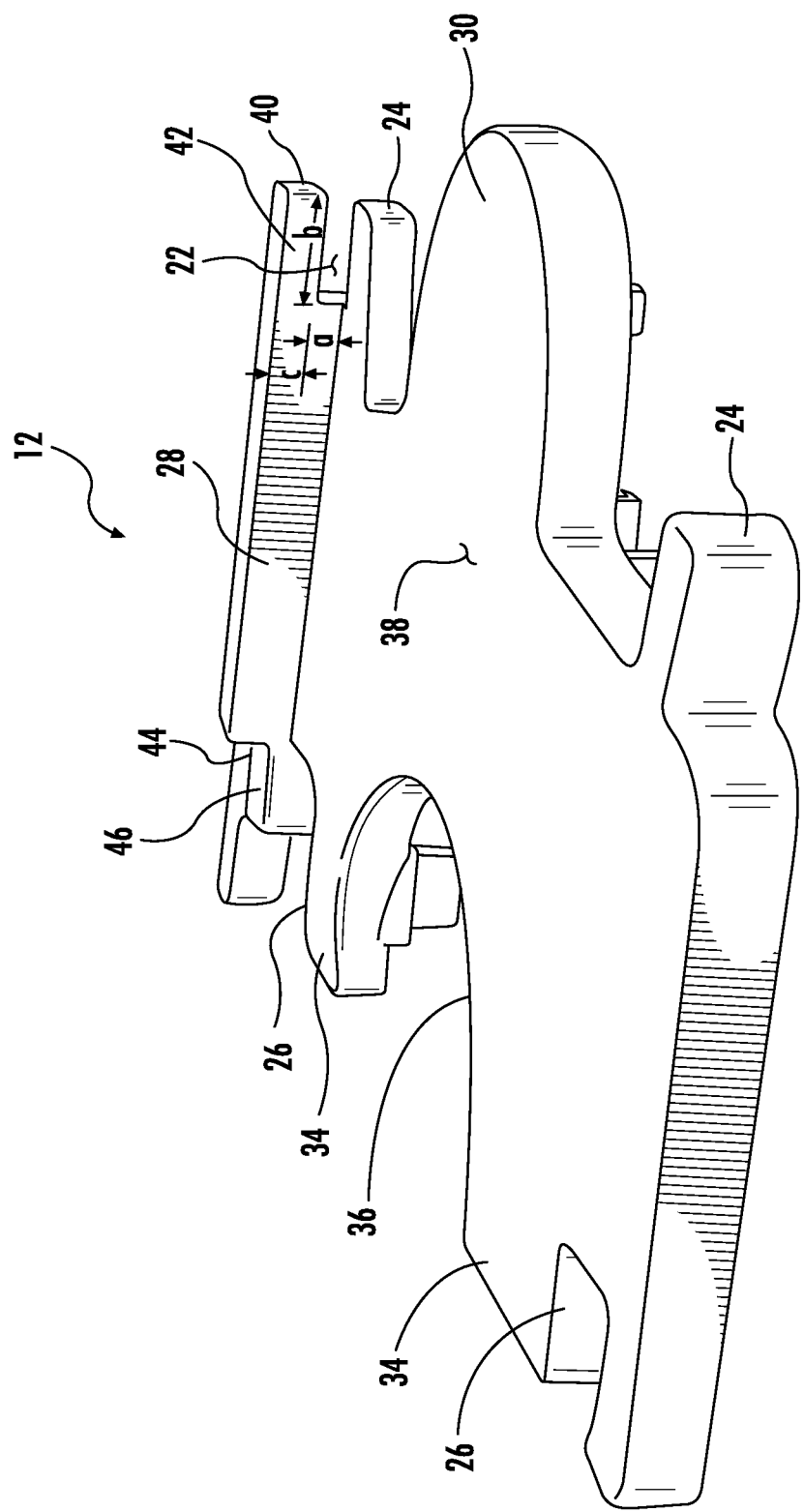
FIG. 1 is a perspective view of one surface platform for a conveyor according to certain aspects of the disclosure.
Figure 2:
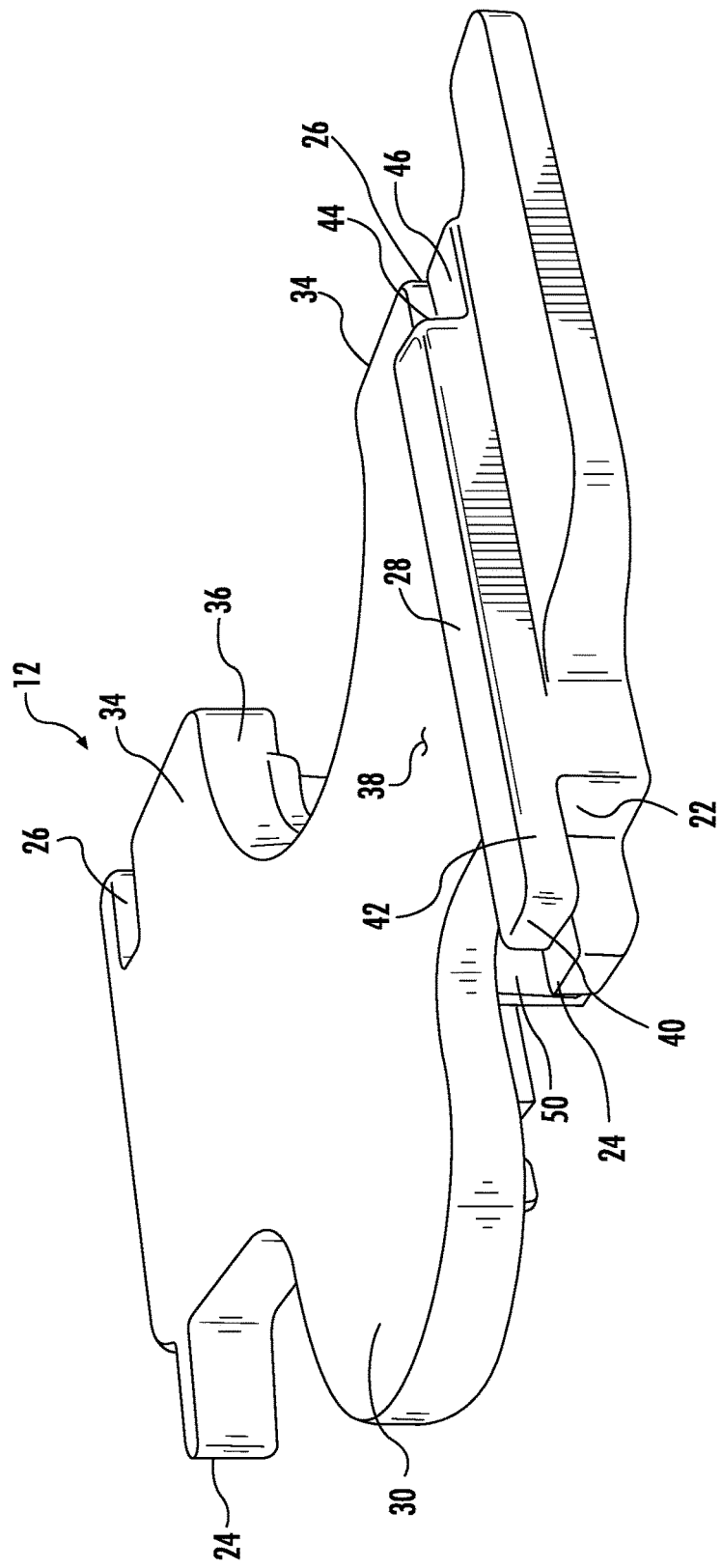
FIG. 2 is an alternate perspective view of the surface platform of FIG. 1.
Figure 3:
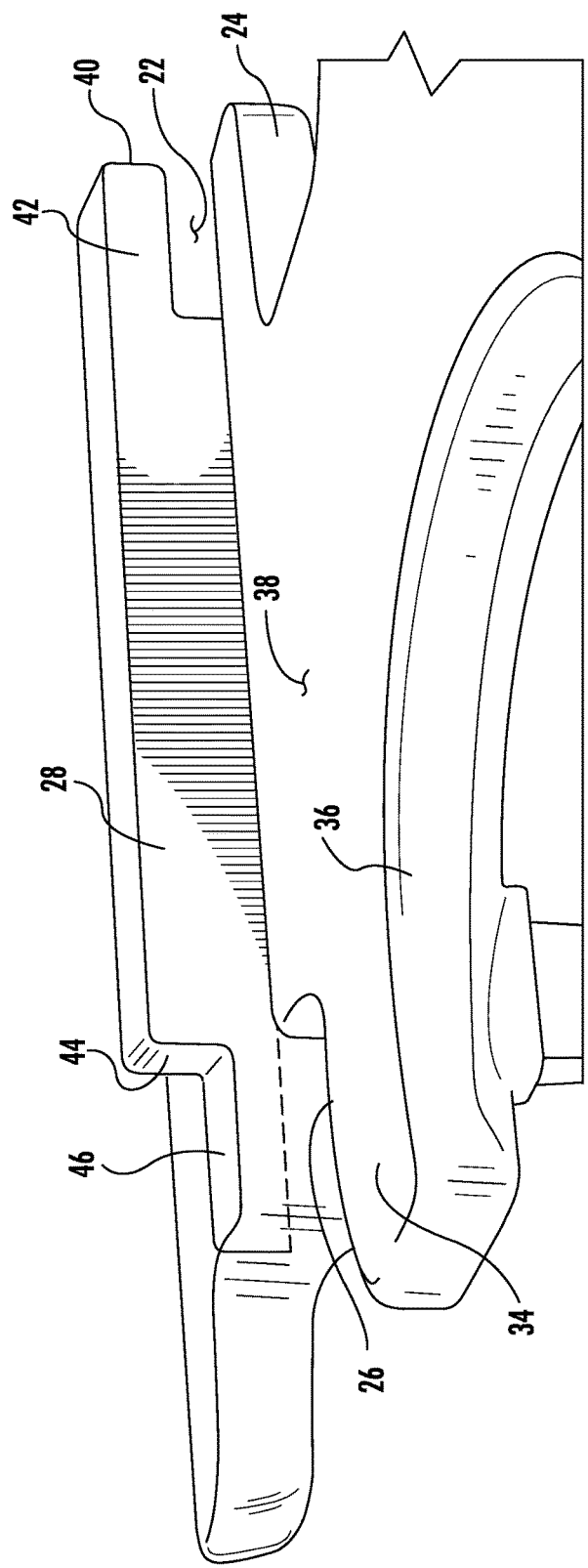
FIG. 3 is a close-up perspective view of the surface platform of FIG. 1.
Figure 4:
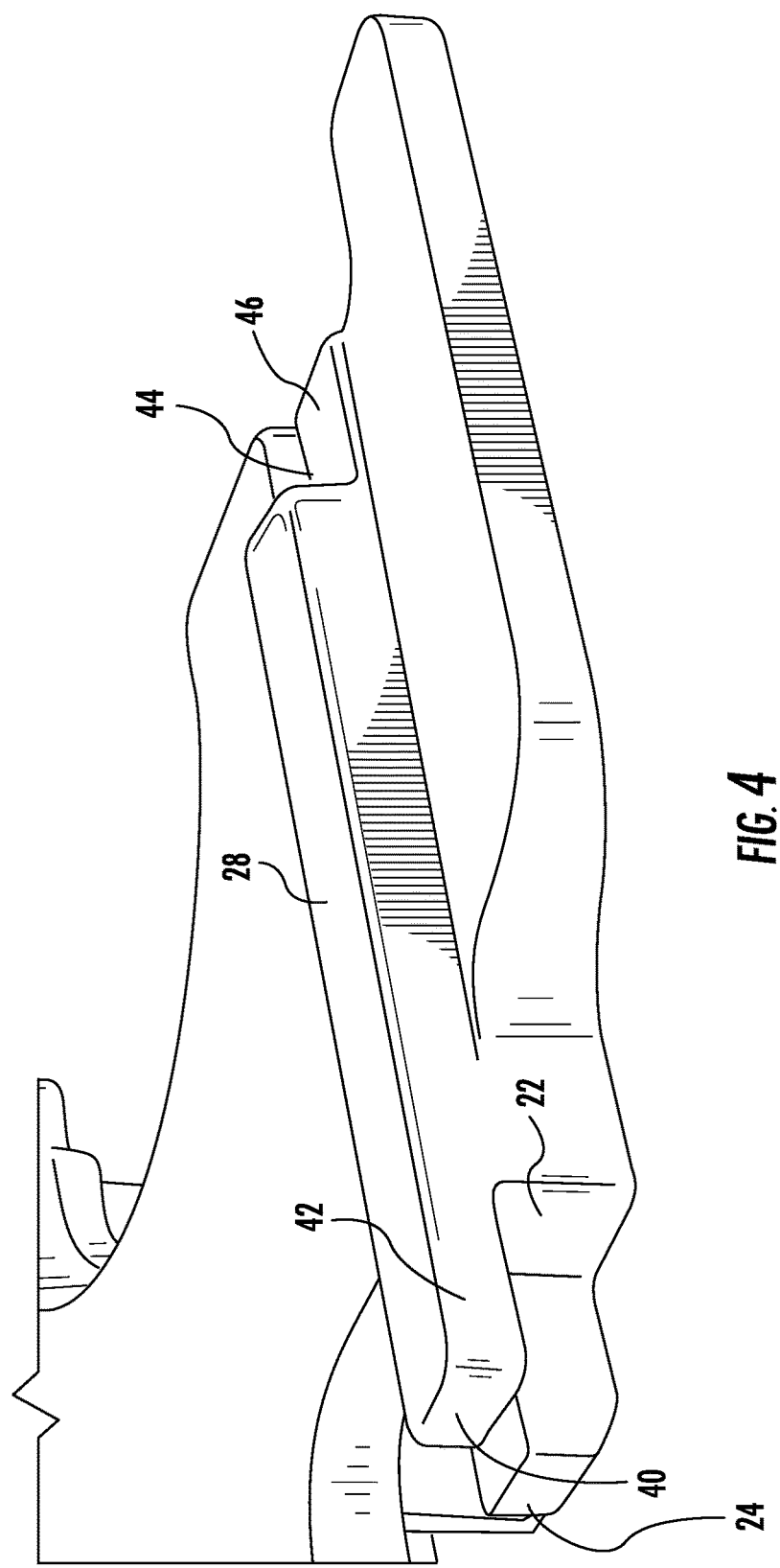
FIG. 4 is an alternate close-up perspective view as in FIG. 2.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 10:
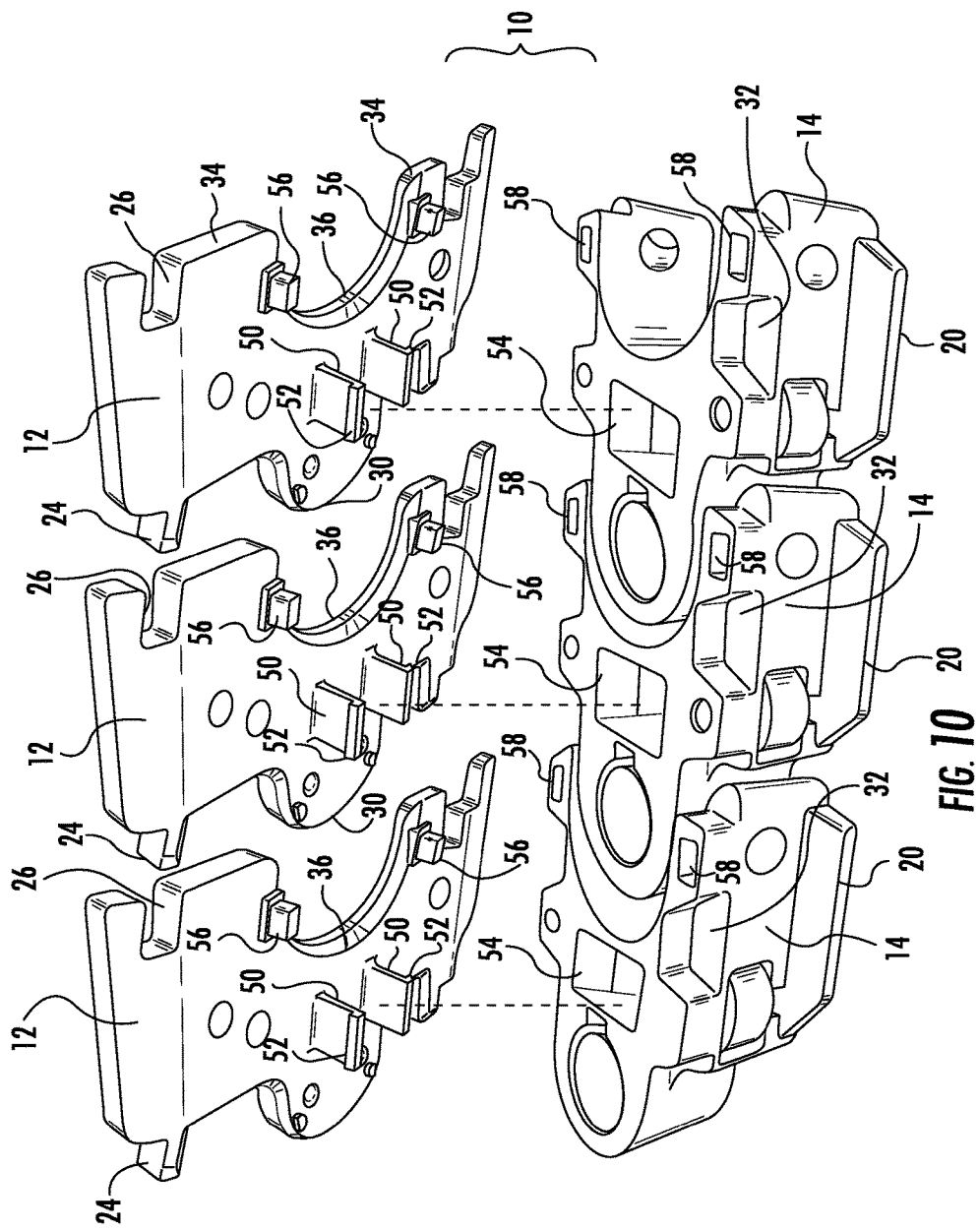
FIG. 10 an exploded perspective view of a number of surface platforms and a conveyor as in FIG. 5.

Referring to the drawings, FIGS. 1-10 shows one example of a conveyor belt having body members with detachable surface platform members in accordance with the present disclosure. FIG. 10 shows a portion of such conveyor 10 including three surface platform members 12 and three interconnected body members 14. Body members 14 are similar to the knuckle drive links shown in U.S. Pat. No. 6,209,716, discussed above. However, it should be clear that body members 14 could have many forms according to the present disclosure.

One surface platform member 12 is attachable to the upper side of each body member 14. As can be seen in FIG. 10, the perimeter shape of each surface platform member 12 may be substantially the same as that of the corresponding knuckle drive link body member 14. This correspondence allows the platform members and body members to move generally together maintaining a consistent conveying surface the as conveyor 10 moves through a conveying path, in particular around bends. Surface platform members 12 may accordingly be shaped such that the leading edge of one surface platform member 12 is configured to be nested within and accepted by a trailing edge of the next surface platform member 12. For instance, leading fingers 24 of one surface platform member 12 are configured to be adapted into trailing grooves 26 of the next surface platform member 12. Additionally, a nose portion 30 of one surface platform member 12 is adapted to fit within a void 36 of an adjacent surface platform member 12.

Articles are placed on top of surface platform members 12 and are conveyed as the plurality of body members 14 move along a supporting structure (not shown). The body members 14 are fitted with flanges 20 on either end in order to ride the supporting structure. Drive indentations 32, sometimes known as "drive dogs", are provided between the flanges 20 and the surface members 12. A drive wheel (not shown) engages drive indentations 32 and propels conveyor belt 10 along the supporting structure.

A set of bifurcated legs 34 on surface platform members 12 form void 36 into which nose portion 30 of an adjacent surface platform member 12 can mate. Conveyor belt 10 may curve along a curved section of supporting structure 16 due to the loosely mated nose portion 30 and void 36. Also, the loose mating connection between the leading fingers 24 and the trailing grooves 26 allow for substantial conveyor belt 10 curvature while not allowing gaps too large to cause issues with conveyed items on the platforms. Providing such spacing thus allows for a substantially continuous transport surface along the length of the conveyor belt 10. The configuration of surface platform members 12 with nose portion 30 and leading fingers 24 results in a surface that does not have a sharp dividing line running laterally across. Such a surface is advantageous because a sharp dividing line may serve as a greater impediment to movement of articles longitudinally upon conveyor belt 10, as is potentially undesirable. However, the present disclosure may be modified in order to produce a series of surface platform members 12 having a sharp dividing line running laterally across if it is desirable for a specific application.

The surface platform members 12 are provided with a substantially vertical rail member 28 along one side. One end of rail member 28 has an undercut portion 22 having a height a above the platform top 38 and a depth b from the forward edge 40 of the rail member. Above undercut portion 22, rail member 28 extension 42 has a height c. The opposite end of rail member 28 has a slot 44 sized with a height just large enough to receive extension 42 (i.e., about height c is or greater). A bottom edge 46 of slot 44 is located above platform top 38. In other words, slot 44 is sized to receive extension 42 when two adjacent platform members are attached to body members 14.

Figure 5:
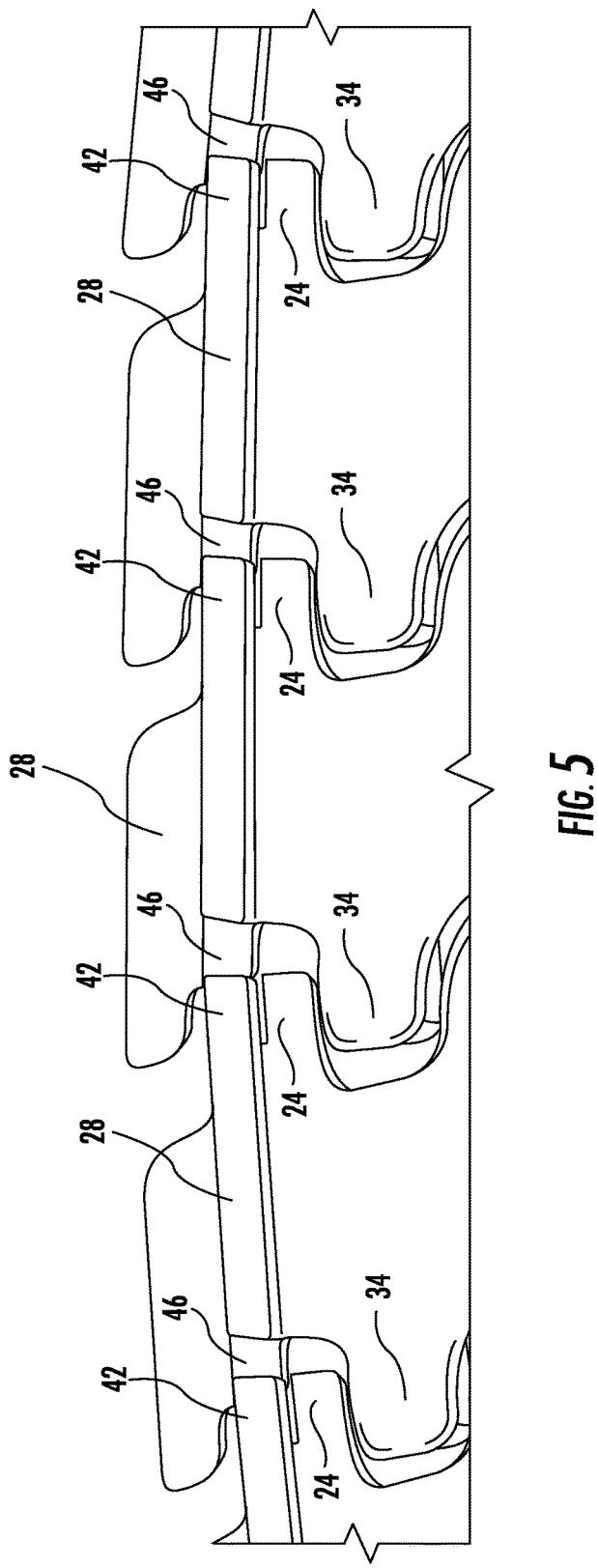
FIG. 5 is a perspective view of a number of surface platforms as in FIG. 1, as installed on a conveyor.
Figure 6:
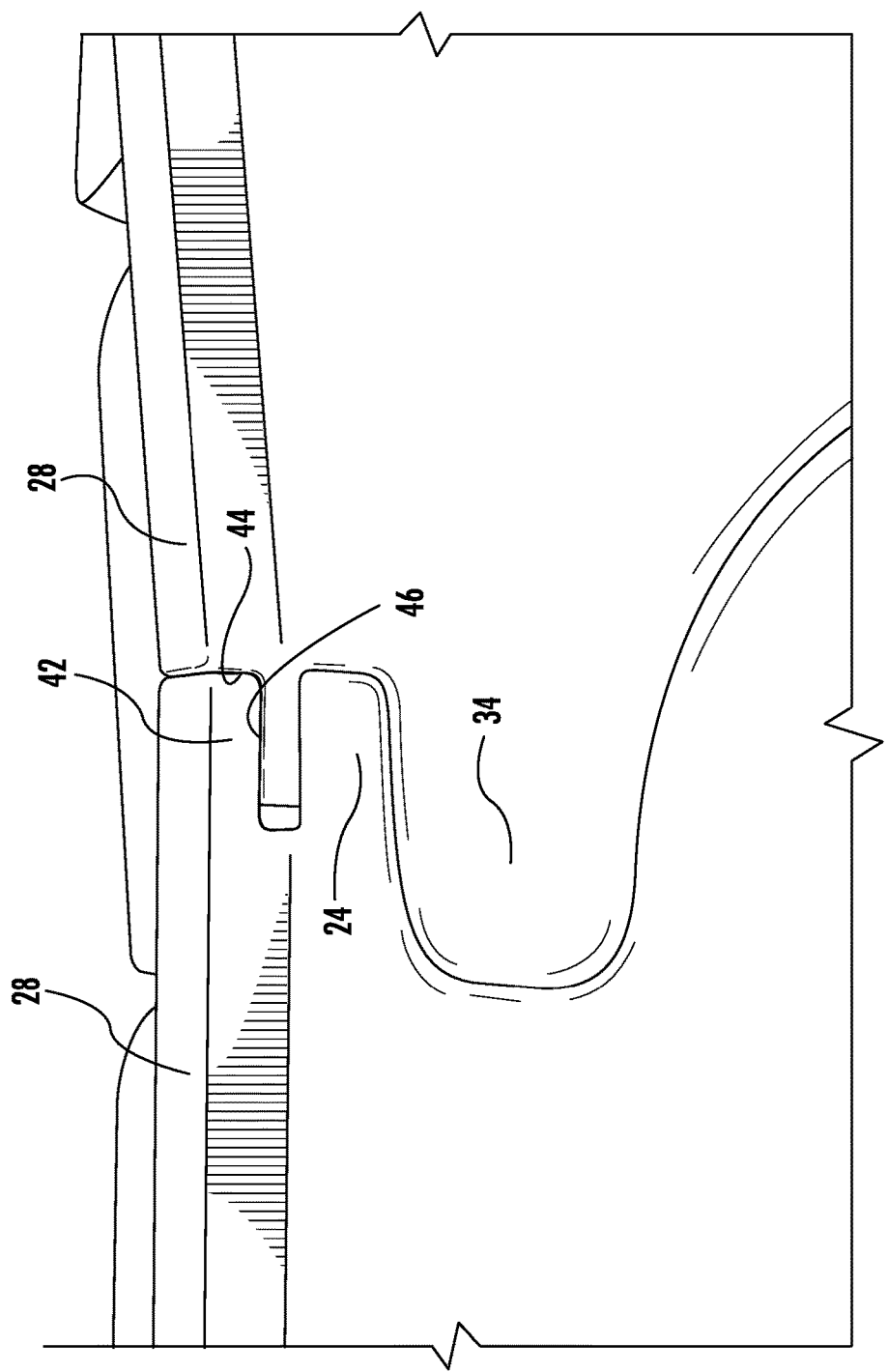
FIG. 6 is a close-up perspective view of the surface platforms of FIG. 5 in a first position.
Figure 7:
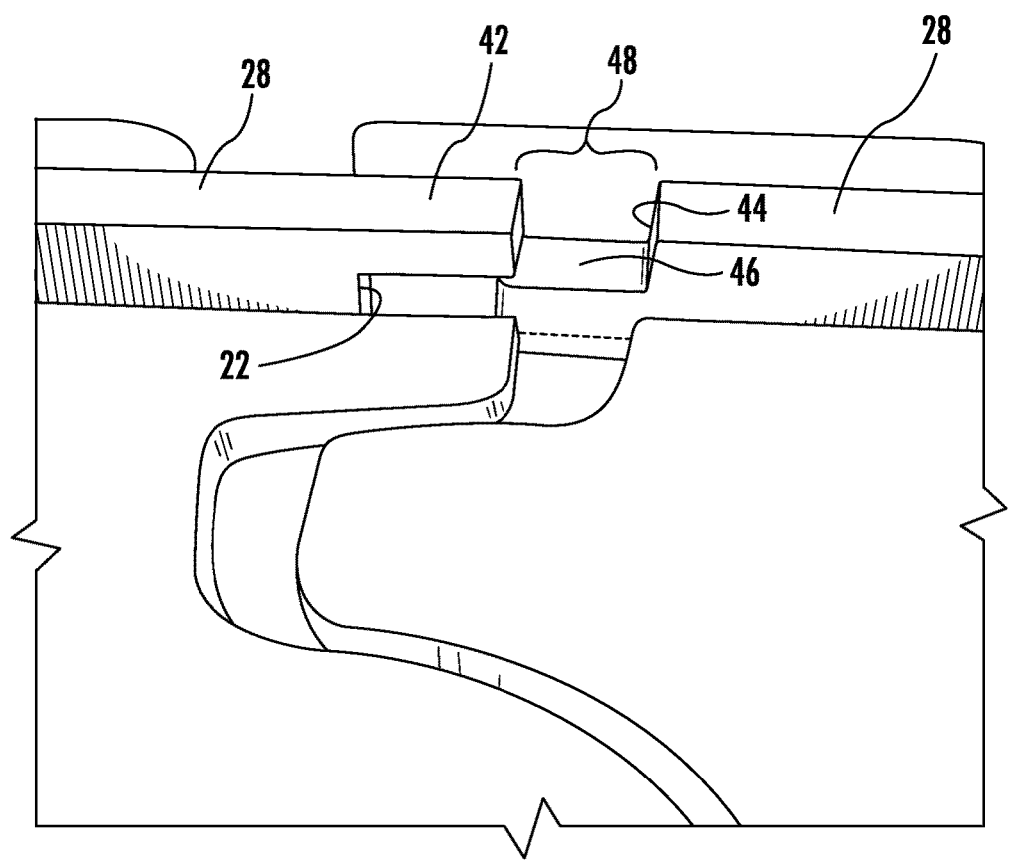
FIG. 7 is a close-up perspective view of the surface platforms of FIG. 5 in a second position.
Figure 8:
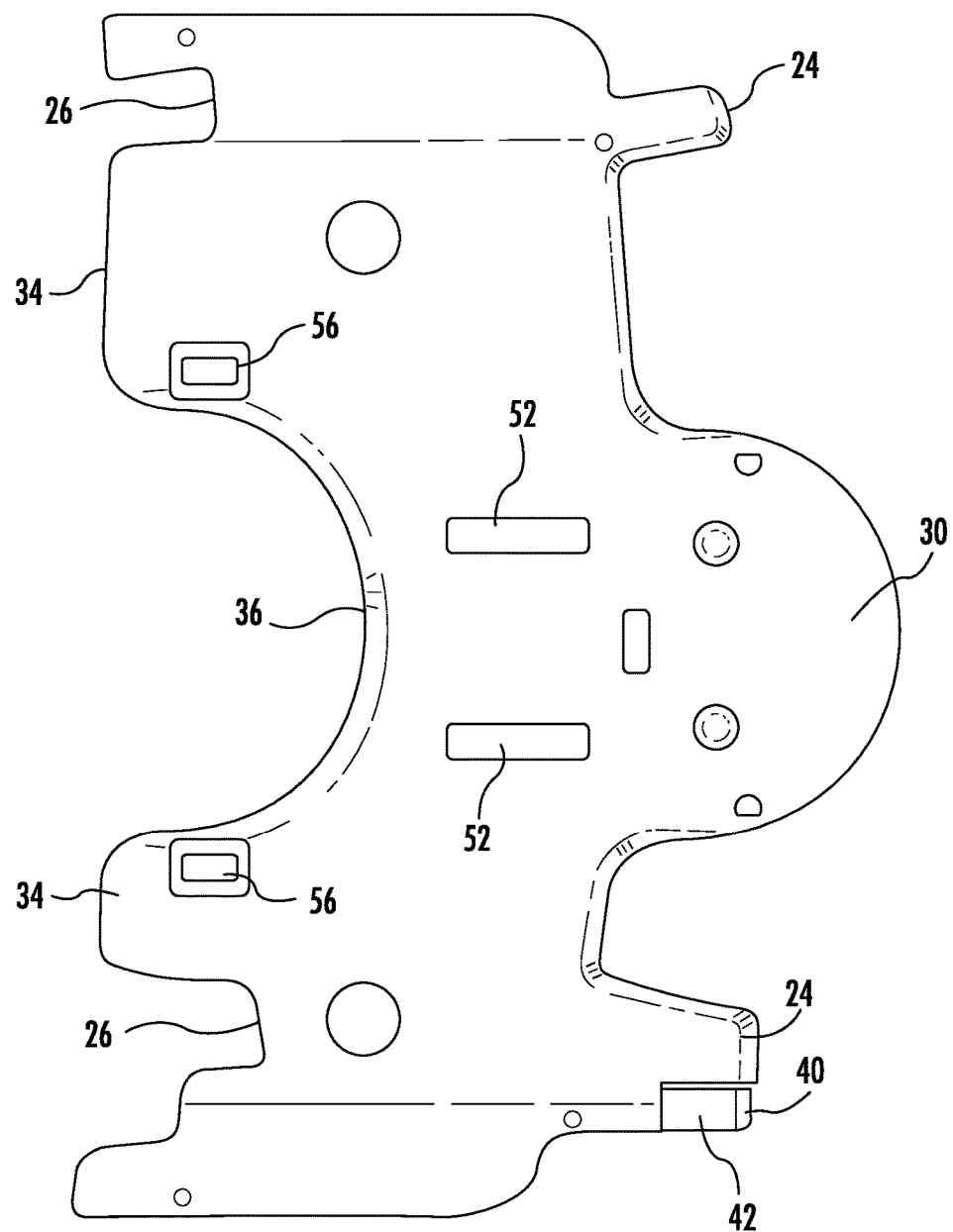
FIG. 8 is a bottom view of a surface platform as in FIG. 1.
Figure 9:
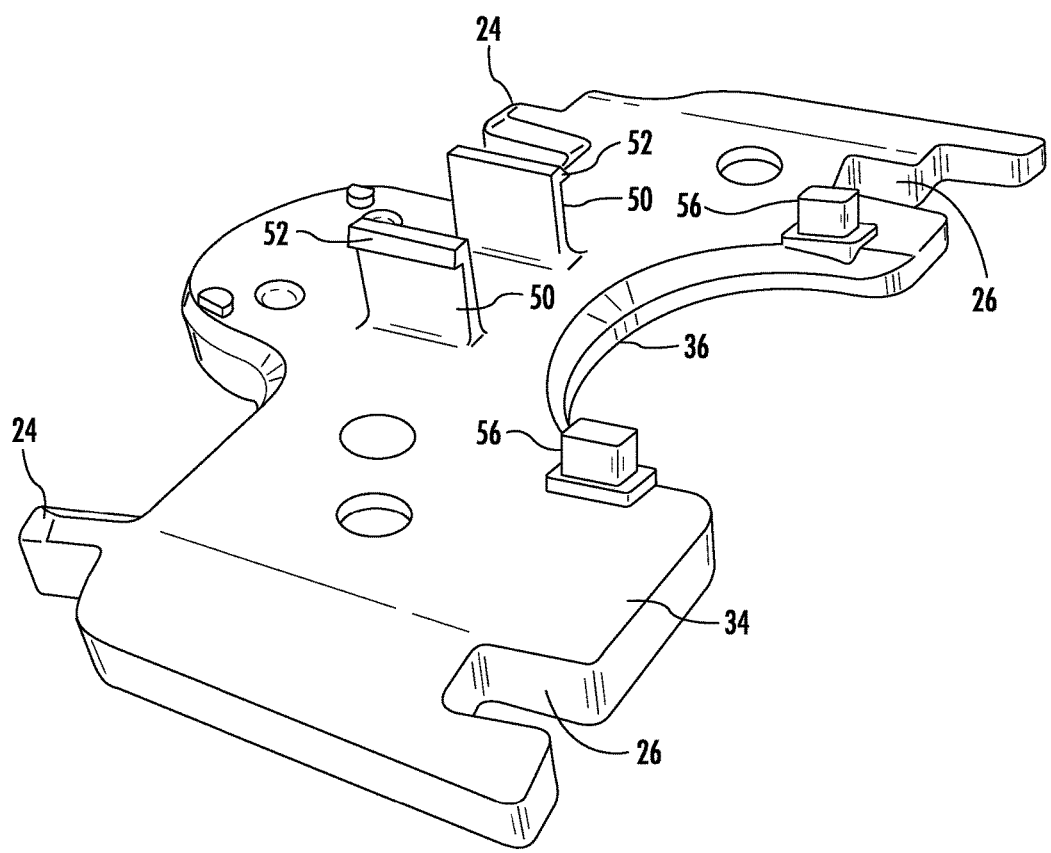
FIG. 9 is a bottom perspective view of a surface platform as in FIG. 1.

The slot 44 and extension 42 allow adjacent platform members to pivot with body members 14 as conveyor travels around a rightward or leftward bend, while still maintaining a substantially continuous rail. FIG. 5 shows a turn to the right and FIG. 6 shows a turn to the left. In both configurations, there is no gap between adjacent platform members along the rail edge due to the overlap between the extensions 42 and slots 44. Because the bottom edge 46 of each slot 44 is located above the platform surface 38, at least some wall exists along the conveyor in any rightward turn. FIG. 6 shows a closeup view of two surface platforms at the mating area between extension 42 and slot 44 in a leftward turn. It can be imagined that without the undercut 22 and slot 44, ends of rail members 28 would simply extend downward vertically. In the orientation of FIG. 6, such structure would not present a problem as to rail continuity. However, one could imagine that a gap would exist in the orientation of FIG. 7 in area 48, were it not for the portion of rail member 28 below bottom edge 46 that extends above surface 38. Accordingly, the present disclosure provides a structure that maintains at least some wall structure formed by different portions of rail members 28 at an outside of a turn. Such wall structure forms a substantially continuous guide surface for items, and can be especially important if articles being conveyed are items such as boxes with corners. Such continuous structure prevents corners or other portions of conveyed items from entering or being interfered with by such gaps by preventing or substantially eliminating such gaps.

Platform members 12 may have attachment and alignment structure of various types. For example, spring tabs 50 with locking members 52 may be provided to mate with openings 54 on body members 14. Also, alignment extensions 56 may also be provided to mate with structure such as edges or openings 68. Thus, platform members 12 and body members 14 may be ready assembled and disassembled for service, conveyed item change out, or cleaning.

Figure 11:
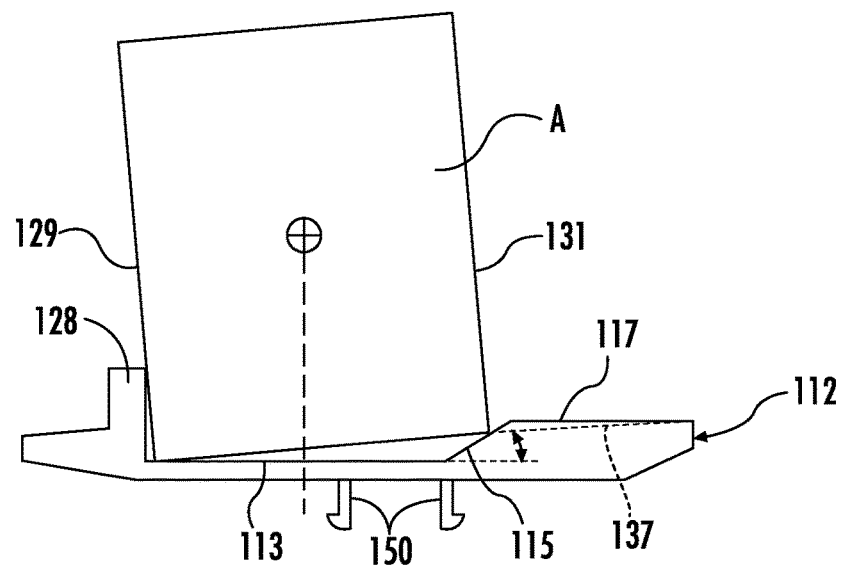
FIG. 11 is a cross-sectional view of an alternate conveyor surface platform according to certain aspects of the disclosure carrying an article.
Figure 12:
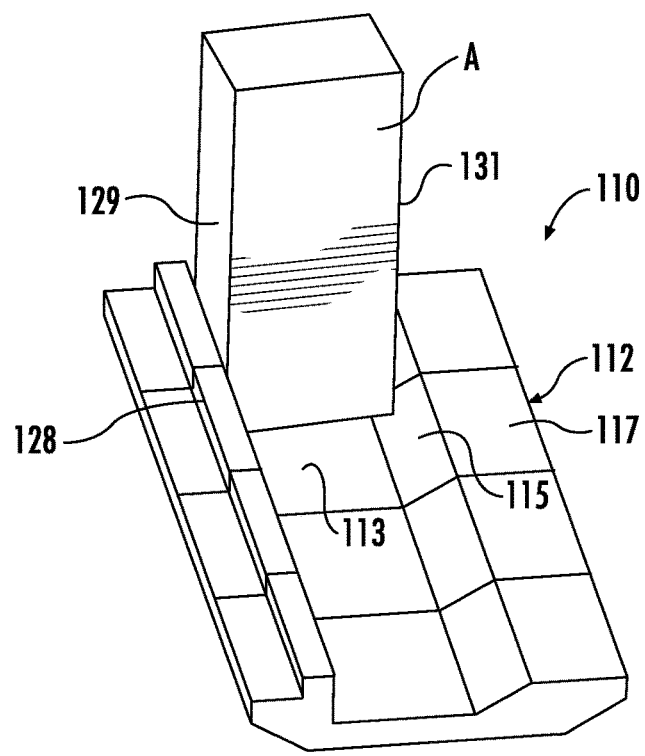
FIG. 12 is a perspective view of a conveyor including platforms as in FIG. 11 carrying articles.

FIGS. 11 and 12 show an alternate surface platform having a slanted top sized to securely hold an article. As shown, belt 110 includes platform members 112 that are attached to body members (not shown, but configured as above). Rail member 128 is located along one side of platform member. Platform member 112 has an upper surface including a first portion 113 adjacent rail member 128, a second portion 115 and a third portion 117. Spring tabs 150 extend from the bottom of platform member 112.

Second portion 115 may be configured askew, angled and/or not parallel to first portion 113. As shown, first portion 113 is planar and second portion 115 is also planar, angled upwardly relative to first portion 113. For example, first portion 113 may be horizontal, and second portion 115 may be at an angle of about 5 degrees to about 30 degrees relative to first portion 113. Third portion 117 may be horizontal, as shown. Alternately, to help items slide toward rail member 128 when introduced to platform member 112 from the right side (as illustrated), the third portion may be slanted downward in the direction of rail member 128. For example, the third portion could be altered to follow dotted line 137, so that a plane coplanar with third portion 137 would intersect the line along which rail member 128 intersects first portion 113.

The first and second portions 113,115 are sized so that when an article A is placed on platform member 112 with one side 129 in contact with rail member 128, a second side 131 contacts the angled second portion 115. Accordingly, the upward slant of second portion 115 relative to first portion 113 helps urge carried article A in a direction toward and into contact with rail member 128. Rail member 128 may if desired extend upwardly a higher distance than with previous designs. Rail member 128 may have a height of about 0.25 to about 1.00 inches relative to first surface 113. To accommodate article A, first portion 113 may extend from rail member 128 to at least about a center portion of the platform member 112. FIG. 11 shows first portion extending 80-90% of the width of article A, although that could vary depending on the size, weight, shape of the articles to be carried.

Figure 13:
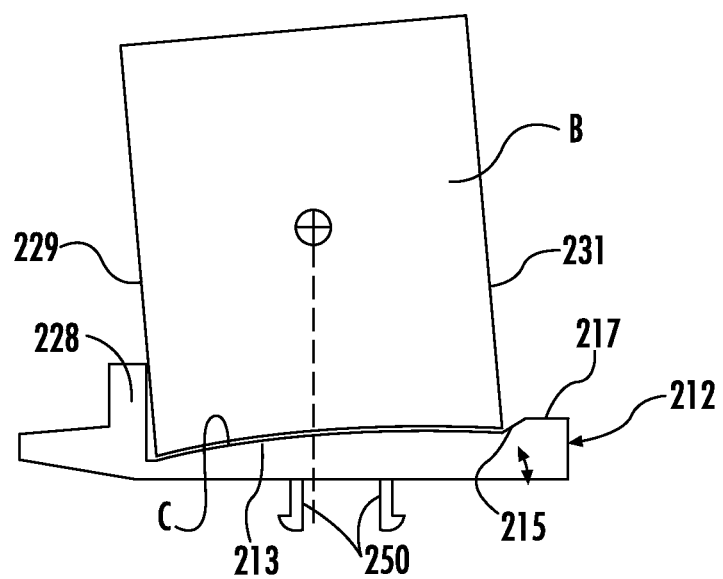
FIG. 13 is a perspective view of another alternate conveyor surface platform according to certain aspects of the disclosure carrying an article.

FIG. 13 shows another modification of platform member 212 that is particularly useful for, but not limited to use with, articles that do not have a substantially planar bottom surface, such as package 15 of U.S. Pat. No. 7,032,810, described above. As shown, platform member 212 includes an upper surface including a first portion 213 adjacent a rail member 228, a second portion 215 and a third portion 217. First portion 113 is curved in a convex fashion, with a radius of curvature selected to substantially match the curvature of the bottom concavity C of box B. Second portion 215 is planar and slanted upward toward third portion 217. Third portion 217 is reduced in size so that second portion 215 ends nearer the edge of platform member 212 than does second portion 115 of platform 112. Also, first portion 213 is at least about half as wide as the entire platform member 212. Spring tabs 250 extend from the bottom of platform member 212.

The curvature of portion 213 generally assists in maintaining the stability and orientation of box B. Because third portion 217 is smaller in platform 212 and tabs 250 are moved toward the center of platform member 212, center of gravity of box B is closer to the center of platform member 212 than is that of article A on platform member 112. Accordingly, the reduced size of portion 217 makes box B less likely to tip going around a curve with rail member 228 to the outside. This is because boxes B will be travelling a shorter distance along the curve, and will therefore be travelling at a smaller relative speed difference as compared to the speed of the centers of the platforms, which is in turn controlled by the speed of the conveyor body members to which the platforms are attached. The smaller dimension of the third portion and moved tabs can be applied to the previous embodiments above, if desired.

Accordingly, platform members 112 and 212 can provide a more secure holding of articles, wherein less tilt from vertical is created than with other available platforms. The secure holding of the articles between rail member 128,228 and second portion 115,215 allows for faster movement of conveyor for higher article throughput. The higher degree of slant of portion 115,215 helps position and then hold the articles in contact with rail member 128,228. The curved nature of portion 213 also provides added stability. The reduced size of third portion 217 and re-centering of platform 212 so that box B is more centrally located on the conveyor also assists with stability. This may be particularly important in curved and non-horizontal paths where reliable transport of articles at faster speeds may be desired.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A conveyor belt for conveying articles having a width comprising:
 an interconnected series of relatively pivotable body members; and
 a plurality of platform members, each platform member attached to a respective one of the body members, each platform member having an upper surface and a substantially vertical rail member extending upward at one side of the upper surface, the upper surface having a first portion adjacent the rail member, a second portion adjacent the first portion, and a third portion adjacent the second portion, the first portion extending from the rail member substantially horizontally toward the second portion at least to a center of the platform member, the second portion extending upward in a direction from the first portion toward the third portion, the first and second portions configured relative to the width of the article such that when placed on the platform member in contact with the rail the article extends to and no further than the second portion, the rail member having a height relative to the first portion, the second portion extending upwardly less than the height of the rail member.

2. The conveyor belt of claim 1, wherein the second portion extends in a plane at an angle of about 5 to about 30 degrees relative to the first portion.

3. The conveyor belt of claim 1, wherein the rail member extends upwardly about 0.25 to about 1.00 inches relative to the first portion.

4. The conveyor belt of claim 1, wherein the platform member includes spring like connecting members to connect the platform member to a conveyor body member.

5. The conveyor belt of claim 1, wherein the platform member is configured so that a center of gravity of the conveyed article is in substantial alignment with a middle of the platform member.

6. A surface platform for a conveying an article having a width on a conveyor belt comprising:
a platform member having an upper surface and a substantially vertical rail member extending upward at one side of the upper surface, the upper surface having a first portion adjacent the rail member, a second portion adjacent the first portion, and a third portion adjacent the second portion, the first portion extending from the rail member substantially horizontally toward the second portion at least to a center of the platform member, the second portion extending upward in a direction from the first portion toward the third portion, the first and second portions configured relative to the width of the article such that when placed on the platform member in contact with the rail the article extends to and no further than the second portion, the rail member having a height relative to the first portion, the second portion extending upwardly less than the height of the rail member.

7. The surface platform of claim 6, wherein the second portion extends in a plane at an angle of about 5 to about 30 degrees relative to the first portion.

8. The surface platform of claim 7, wherein the rail member extends upwardly about 0.25 to about 1.00 inches relative to the first portion.

9. The surface platform of claim 7, wherein the platform member includes spring like connecting members to connect the platform member to a conveyor body member.

10. The surface platform of claim 7, wherein the platform member is configured so that center of gravity of the conveyed article is in substantial alignment with a middle of the platform member.

* * * * *